Aug. 13, 1940.　　　　S. D. MARTIN　　　　2,210,986
WALL HYDRANT
Filed Nov. 30, 1939
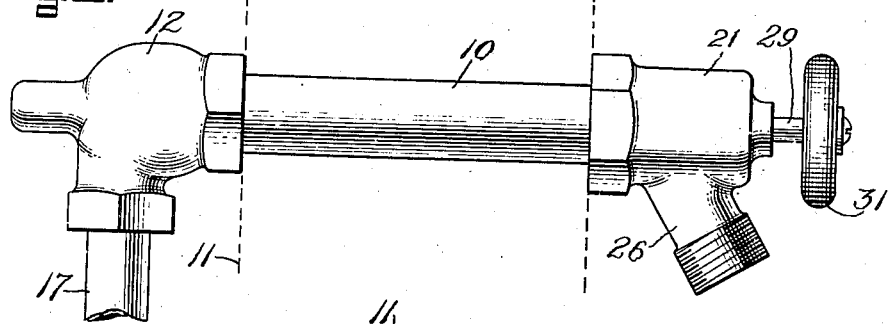
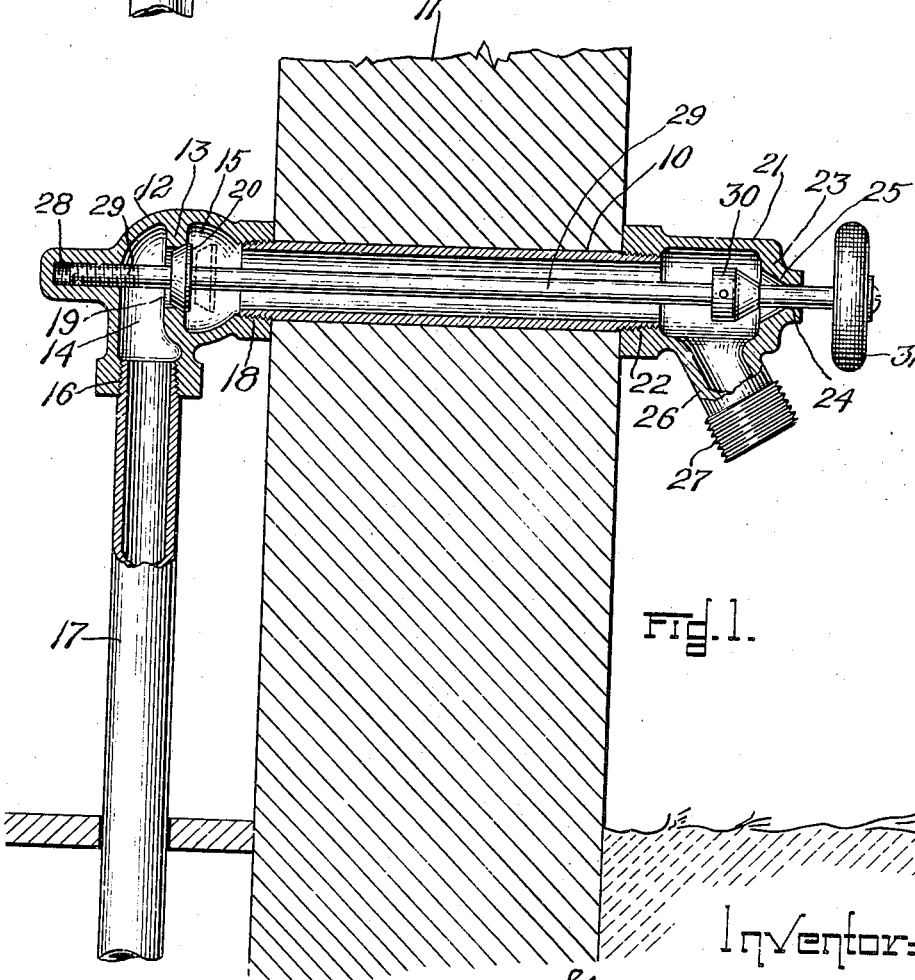
Inventor=
Stanley D. Martin
By Arthur T. Randall
atty Patented Aug. 13, 1940

2,210,986

UNITED STATES PATENT OFFICE 2,210,986

WALL HYDRANT

Stanley D. Martin, Waltham, Mass.

Application November 30, 1939, Serial No. 306,872

1 Claim. (Cl. 251—156)

My invention relates to improvements in wall hydrants such as are provided for the attachment of a hose for washing and sprinkling outside of the wall of a building, and it has for its object to provide a wall hydrant of simple, inexpensive and efficient construction.

To these ends I have provided an improved wall hydrant constructed and operating as set forth in the following description, the several novel features of the invention being pointed out and defined in the claim at the close thereof.

In the accompanying drawing:

Figure 1 is a sectional view showing the sill or wall of a building equipped with a hydrant constructed in accordance with this invention.

Figure 2 is an elevation of the hydrant shown in Fig. 1.

The illustrated embodiment of my invention comprises a section of pipe 10 that is exteriorly threaded at its opposite ends and extends through the building wall 11 as shown. At the inner end of this pipe section 10 is provided an elbow 12 interiorly divided by a partition 13 so as to provide an inlet chamber 14 and an outlet chamber 15. The inlet chamber 14 is provided with a threaded inlet port 16 into which is screwed one end of a pipe 17 that is connected with a supply of water under head or pressure while the outlet chamber 15 is provided with a threaded outlet port 18 into which is screwed the inner end of the pipe section 10.

The partition 13 is made with a port 19 and also with a seat for a conical valve 20 which is disposed within the outlet chamber 15. The outer end of pipe section 10 communicates with the interior of a one-piece faucet fitting 21 having a body portion formed at one end with a threaded port 22 into which is screwed the outer end of pipe section 10. At its outer end faucet body 21 is made with an end wall 23 that is formed with a central aperture 24 and the inner face of wall 23 is formed with a conical valve seat 25 surrounding the aperture 24.

The faucet body 21 is also formed with a downwardly directed outlet nipple 26 whose lower end portion is exteriorly threaded, as at 27, to adapt it to be coupled to a hose.

The elbow 12 at the inner end of pipe section 10 is made with a threaded blind socket 28 which is in axial alignment with the port 19 and aperture 24. This socket 28 is occupied by the threaded inner end of a valve stem 29 which carries the conical valve 20 that is adapted to seat against the partition 13 and also another conical valve 30 disposed within the faucet body 21 and adapted to close against the conical seat 25 provided upon the outer end wall 23 of the faucet body. The two valves 20 and 30 are spaced-apart a distance that is less than the distance between partition 13 and valve seat 25 so that when valve stem 29 is rotated in one direction valve 20 will be moved away from its seat on partition 13 while valve 30 will be moved in position against its seat 25. When thus adjusted the valve 20 occupies the dotted line position shown in Fig. 1 and water flows from pipe 17 through elbow 12, pipe section 29 into faucet body 21 from which it discharges through nipple 26.

The rotation of valve stem 29 in the opposite direction seats valve 20 against partition 13 and shuts off the flow of water and incidently the valve 30 moves away from seat 25 into the position shown in Fig. 1.

The outer end of stem 29 is rotatably supported within the aperture 24 at the outer end of the faucet body and, as will be clear, when valve 20 is moved into its fully open position and valve 30 is seated the escape of water through this aperture is prevented. At its outer end the valve stem 29 is provided with a handle 31 by means of which it is operated manually.

The above described hydrant has the advantage that the valve stem 29 is supported at its opposite ends so that the valves 20 and 30 are guided properly toward and from their seats when the valve stem is operated in one direction or the other. Another advantage to the above described construction is that few parts are required and these are of simple construction and inexpensive. Also, the number of joints required are reduced to a minimum.

What I claim is:

A wall hydrant of the class described comprising a pipe section to extend through a wall, said pipe section being exteriorly threaded at its opposite ends; an elbow member at the inner end of said pipe section interiorly divided by a partition to provide inlet and outlet chambers at opposite sides thereof, said partition being formed with a port extending therethrough, said outlet chamber being provided with a threaded outlet port that is occupied by the inner threaded end of said pipe section and said inlet chamber being provided with an inlet port adapted to be connected by a pipe with a supply of water under head of pressure; a faucet comprising a body portion made with a threaded inlet port that is occupied by the outer threaded end of said pipe section and having an outer wall formed with an aperture that is axially alined with the port of said partition; and a valve member comprising a stem extending through said aperture, said pipe section and said port, into said inlet chamber and having its inner end portion threaded and occupying a threaded blind socket formed in a wall of said inlet chamber opposite said port, said stem being provided with two valves forming rigid parts thereof one of which is disposed within said faucet and the other within said outlet chamber and the distance between said valves being less than the distance between said outer wall and said partition so that when said stem is screwed into said socket one of said valves is seated on said partition to close said port and when screwed in the opposite direction said port is opened and the other valve is seated against said outer wall to close said aperture and limit the opening movement of said first-mentioned valve, and a handle on said stem outside of said faucet member.

STANLEY D. MARTIN.